United States Patent
Berne et al.

(10) Patent No.: US 11,772,574 B2
(45) Date of Patent: Oct. 3, 2023

(54) VEHICLE COMPRISING A DRIVER CAB AND A MONITORING DEVICE FOR MONITORING A FRONT DEAD ANGLE AREA AND MONITORING DEVICE FOR SUCH VEHICLE

(71) Applicant: Volvo Truck Corporation, Gothenburg (SE)

(72) Inventors: Nicolas Berne, Heyrieux (FR); Kevin Bufalo, Beynost (FR)

(73) Assignee: Volvo Truck Corporation, Gothenburg (SE)

( * ) Notice: Subject to any disclaimer, the term of this patent is extended or adjusted under 35 U.S.C. 154(b) by 418 days.

(21) Appl. No.: 17/050,707

(22) PCT Filed: May 3, 2018

(86) PCT No.: PCT/EP2018/061396
§ 371 (c)(1),
(2) Date: Oct. 26, 2020

(87) PCT Pub. No.: WO2019/210963
PCT Pub. Date: Nov. 7, 2019

(65) Prior Publication Data
US 2021/0237662 A1    Aug. 5, 2021

(51) Int. Cl.
*B60R 11/04* (2006.01)
*E05F 15/63* (2015.01)
(Continued)

(52) U.S. Cl.
CPC .............. *B60R 11/04* (2013.01); *B62D 33/06* (2013.01); *E05F 15/63* (2015.01); *G03B 17/561* (2013.01);
(Continued)

(58) Field of Classification Search
None
See application file for complete search history.

(56) References Cited

U.S. PATENT DOCUMENTS 6,524,020 B2 * 2/2003 Ellinger .................. B60R 11/04
                                                    396/419
9,623,811 B2    4/2017 Alexander et al.
(Continued)

FOREIGN PATENT DOCUMENTS

KR    20070038315 A    4/2007
WO    2012/066867 A1    5/2012

OTHER PUBLICATIONS

International Search Report and Written Opinion for PCT/EP2018/061396, dated Jan. 31, 2019, 9 pages.

*Primary Examiner* — Rodney E Fuller
(74) *Attorney, Agent, or Firm* — Withrow & Terranova, PLLC

(57) ABSTRACT

Vehicle (1) comprising a driver cab (2) and a monitoring device (15) for monitoring a front dead angle area in front of the driver cab (2), the driver cab (2) presenting a front surface (F), the monitoring device (15) comprising: —a front camera (16) having a field of view, —an arm (17) movably mounted to the driver cab (2) between a retracted position, in which said arm (17) extends along the front surface (F), and an active position in which said arm (17) is spaced apart from the front surface (F), wherein the front camera (16) is mounted to the arm (17) so that the field of view images the front dead angle area when the arm (17) is in the active position.

15 Claims, 6 Drawing Sheets

Figure 1:
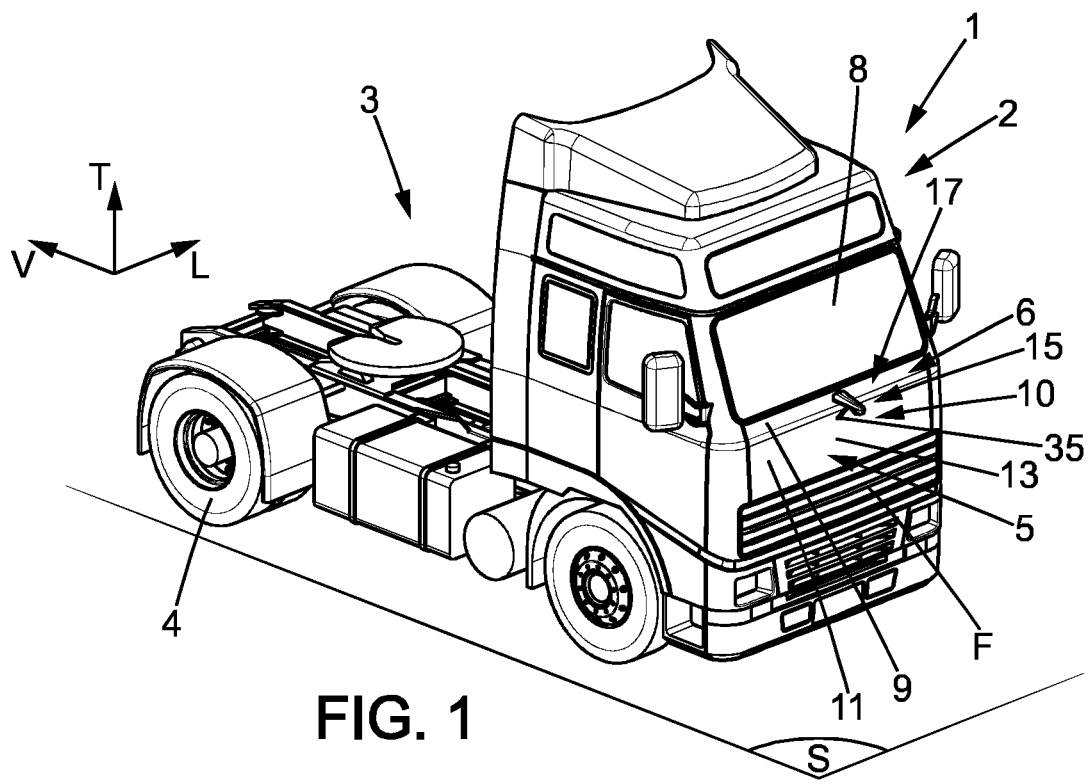

(51) Int. Cl.
*B62D 33/06* (2006.01)
*G03B 17/56* (2021.01)

(52) U.S. Cl.
CPC ... *E05Y 2201/434* (2013.01); *E05Y 2201/454* (2013.01); *E05Y 2900/516* (2013.01)

(56) References Cited

U.S. PATENT DOCUMENTS

| | | | | |
|---|---|---|---|---|
| 9,912,912 | B2* | 3/2018 | Buschmann | B60R 11/04 |
| 11,230,235 | B2* | 1/2022 | Miethig | F16H 3/44 |
| 2006/0061656 | A1 | 3/2006 | Lang et al. | |
| 2008/0198227 | A1* | 8/2008 | Cieler | B60R 11/04 |
| | | | | 348/148 |
| 2012/0315027 | A1* | 12/2012 | Schutz | B60R 11/04 |
| | | | | 396/419 |
| 2017/0244902 | A1* | 8/2017 | DiMenichi | H04N 23/50 |
| 2019/0118728 | A1* | 4/2019 | Oba | B60R 1/0605 |
| 2020/0301257 | A1* | 9/2020 | Genovese | G03B 17/561 |

* cited by examiner

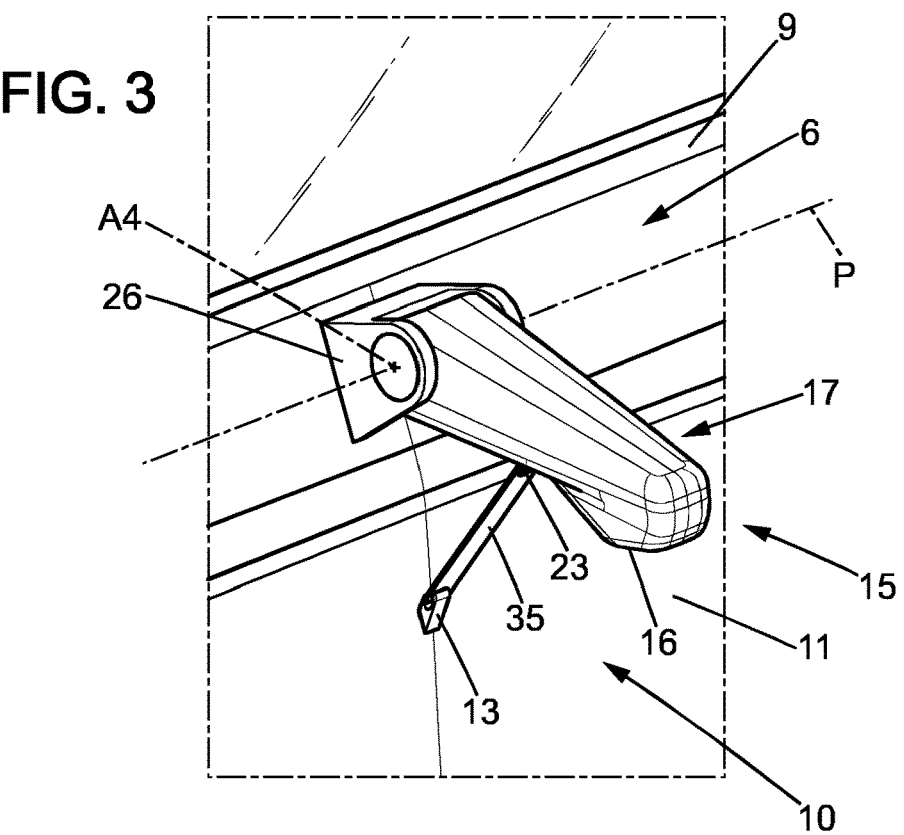
FIG. 3
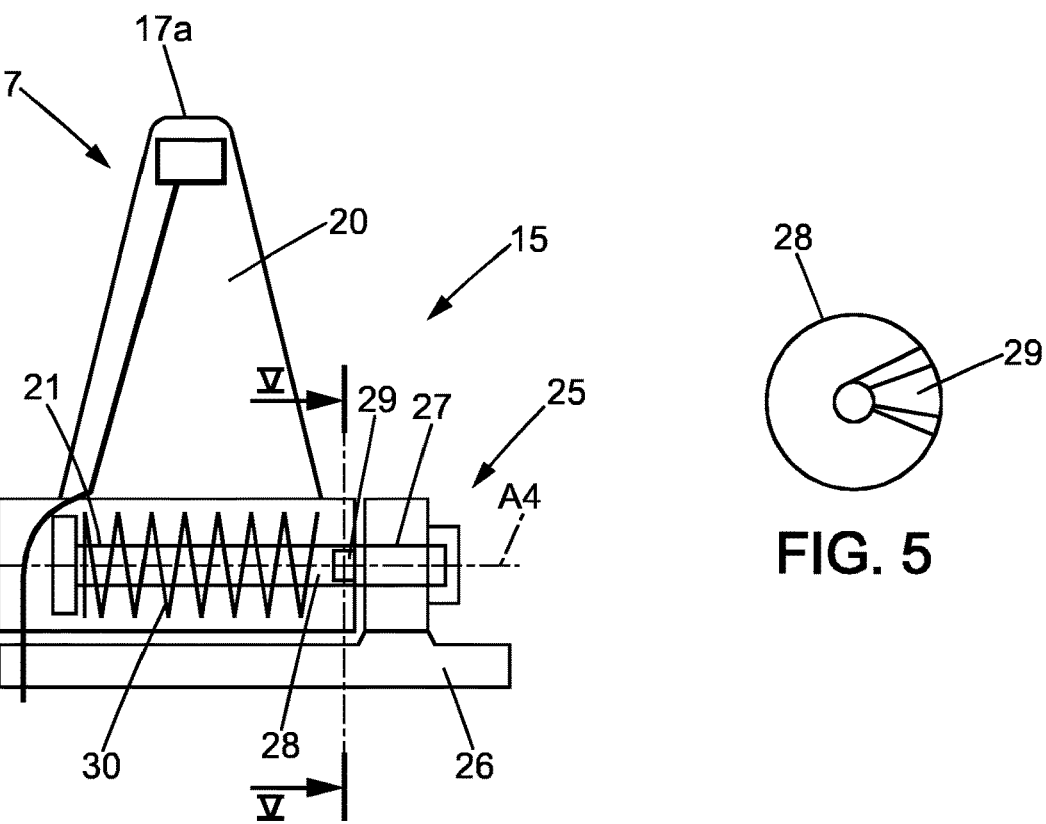
FIG. 4
FIG. 5

VEHICLE COMPRISING A DRIVER CAB AND A MONITORING DEVICE FOR MONITORING A FRONT DEAD ANGLE AREA AND MONITORING DEVICE FOR SUCH VEHICLE

This application is a 35 USC 371 national phase filing of International Application No. PCT/EP2018/061396, filed May 3, 2018, the disclosure of which is incorporated herein by reference in its entirety.

The invention relates to a vehicle comprising a driver cab and a monitoring device for monitoring a front dead angle area and to a monitoring device for such vehicle.

In particular, although not limited thereto, the invention applies to large vehicles such as trucks and buses which present a front dead angle area in front of the driver cab, which dead angle area cannot be viewed by a driver seated in the driver cab.

Monitoring devices implementing a front camera, also referred to as camera of class VI according to the UN Regulation No. 46, arranged so that its field of view may image the front dead angle area is known. An example of such monitoring device is especially disclosed in US 2006/0061656.

However, the known monitoring devices which protrude from the front surface of the driver cab are subjected to damages, especially due to shocks with elements coming into contact with the arm as they are moved in closed proximity to it.

The invention aims to solve the above mentioned problems.

To this end, according to a first aspect, the invention provides a vehicle comprising a driver cab and a monitoring device for monitoring a front dead angle area in front of the driver cab, the driver cab presenting a front surface, the monitoring device comprising:
  a front camera having a field of view,
  an arm movably mounted to the driver cab between a retracted position, in which said arm extends along the front surface, and an active position in which said arm is spaced apart from the front surface,
  wherein the front camera is mounted on the arm so that the field of view images the front dead angle area when the arm is in the active position.

Hence, in situations where it is required, such as driving or manoeuvring, the monitoring device enables the front dead angle area to be viewed thanks to the arm in the active position, while being protected from damages in other situations, such as when the vehicle is parked or washed, thanks to the arm in the retracted position.

The arm may present opposed first and second ends and a lower surface, the first end being pivotally mounted about an arm pivot axis to the driver cab, the lower surface being arranged to face a ground surface on which the driver cab rests in the active position, the front camera being mounted on the lower surface at a distance from the first end.

The arm pivot axis may extend along a transverse direction of the driver cab, the lower surface of the arm facing the front surface of the driver cab in the retracted position.

The monitoring device may further comprise a connecting rod presenting a support position in which said connecting rod extends between the front surface of the driver cab and the arm to maintain the arm in the active position, and a released position in which said connecting rod allows the arm to move with respect to the front surface of the driver cab.

The arm and the front surface of the driver cab may have respective attaching elements, the connecting rod may have first and second ends attached to the attaching elements in the support position, at least one of the first and second ends and the attaching elements being configured to enable one of the first and second ends to be released from the attaching element.

The driver cab may comprise a frame and a front panel, the frame including a housing presenting an access opening in a longitudinal direction on the front surface of the driver cab, the front panel presenting an outer surface, the front panel having an upper portion pivotally mounted about a panel pivot axis perpendicular to the longitudinal direction to the frame between:
  a closed position wherein the front panel covers the access opening,
  an open position wherein the front panel is spaced apart from the access opening,
  wherein the first end of the arm is mounted to the frame above the upper portion of the front panel and the attaching element of the front surface of the driver cab is arranged on the outer surface of the front panel.

Thanks to these provisions, the arm secured to the frame is not subjected to vibrations thereby improving reliability of the images acquired by the front camera and preventing a premature wear of the monitoring device. In addition, the arm follows the displacement of the front panel thereby preventing the front panel from damaging the camera as it is moved from the closed position to the open position. The modularity of the driver cab may be further improved since the front panel may be conformed in any suitable manner, especially as regards aerodynamics considerations.

The monitoring device may comprise a returning member configured to urge the arm towards the retracted position.

The arm in the retracted position may rest against the front surface of the driver cab.

The arm may be arranged in a central portion of the driver cab.

The monitoring device may comprise an actuator configured to move the arm between the retracted position and the active position and an electronic control unit connected to the actuator to control movement of the arm.

According to a second aspect, the invention provides a monitoring device for a vehicle as previously defined, the vehicle comprising a driver cab presenting a front surface, the monitoring device being configured to monitor a front dead angle area in front of the driver cab, the monitoring device comprising:
  a front camera having a field of view,
  an arm configured to be movably mounted to the driver cab between a retracted position in which said arm extends along the front surface, and an active position in which said arm is spaced apart from the front surface,
  wherein the front camera is mounted to the arm so that the field of view images the dead angle area when the arm is in the active position.

Figure 2:
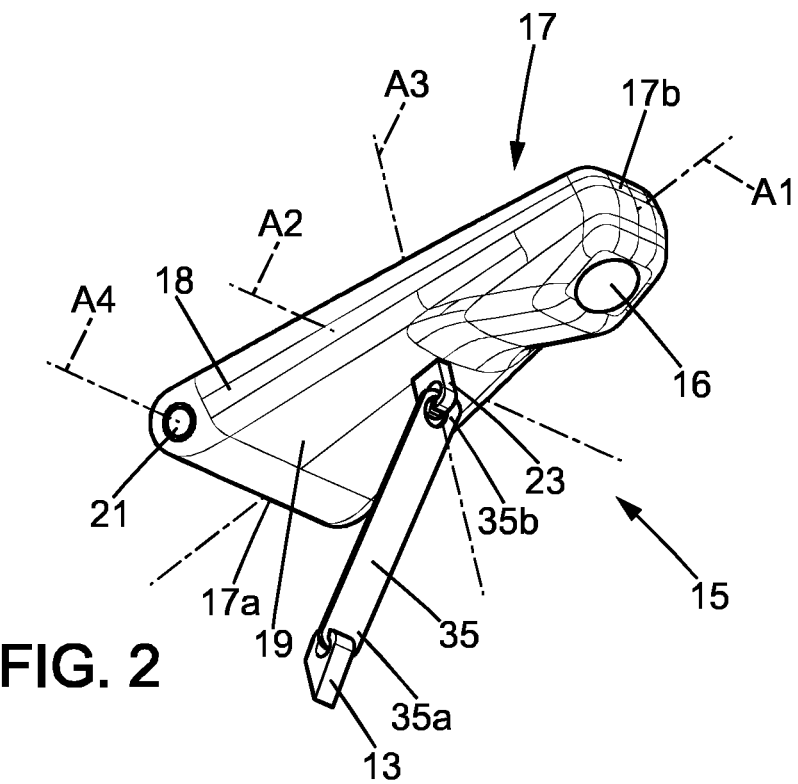
Figure 6:
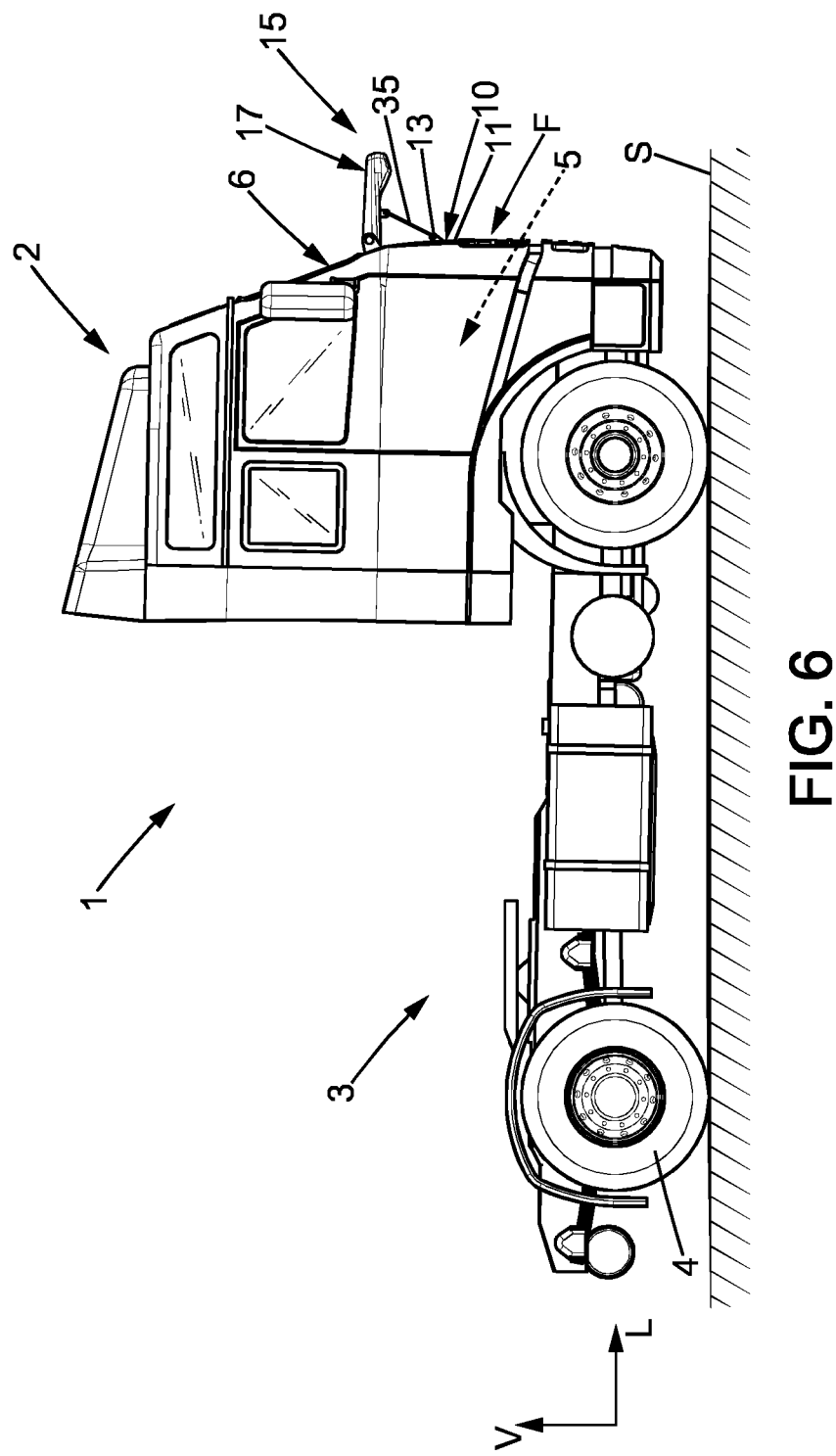
Figure 7:
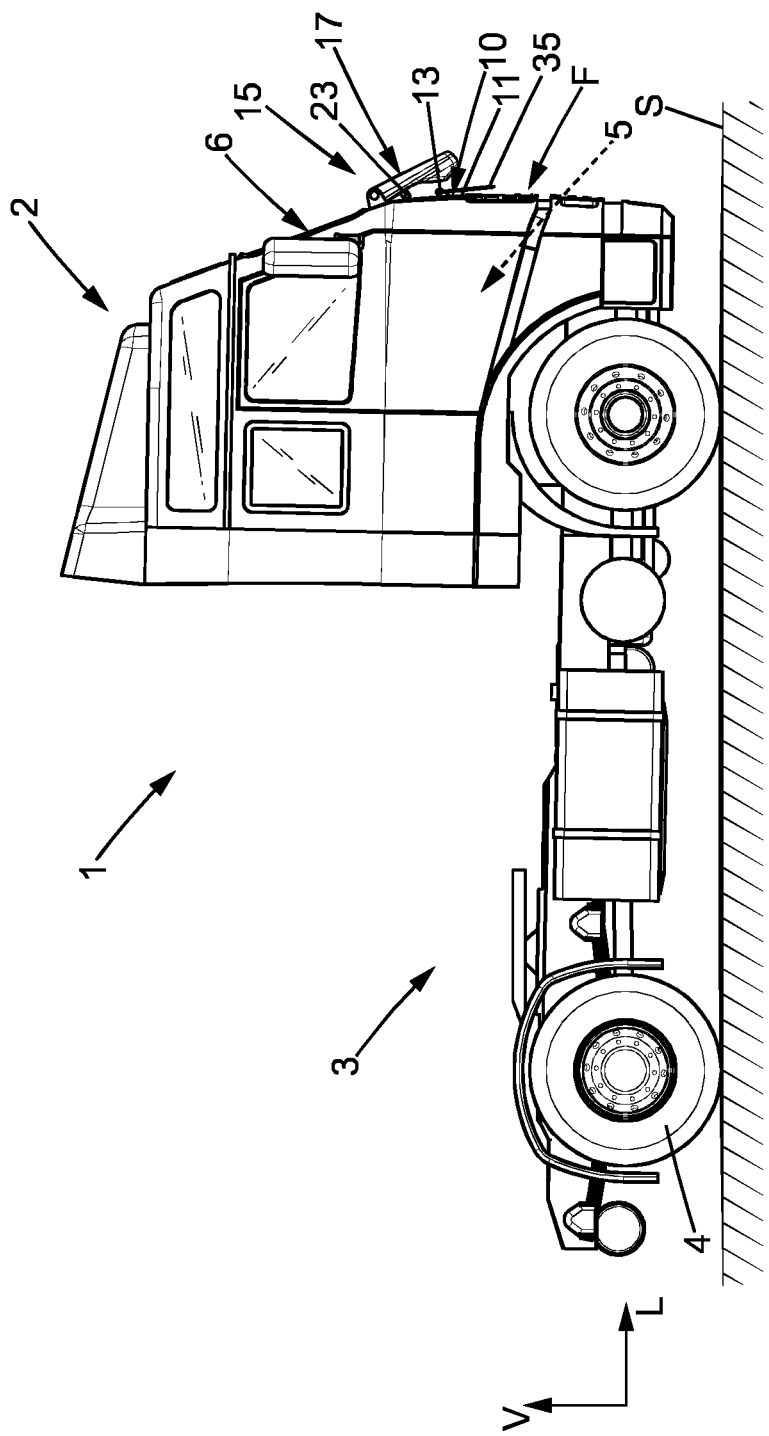
Figure 8:
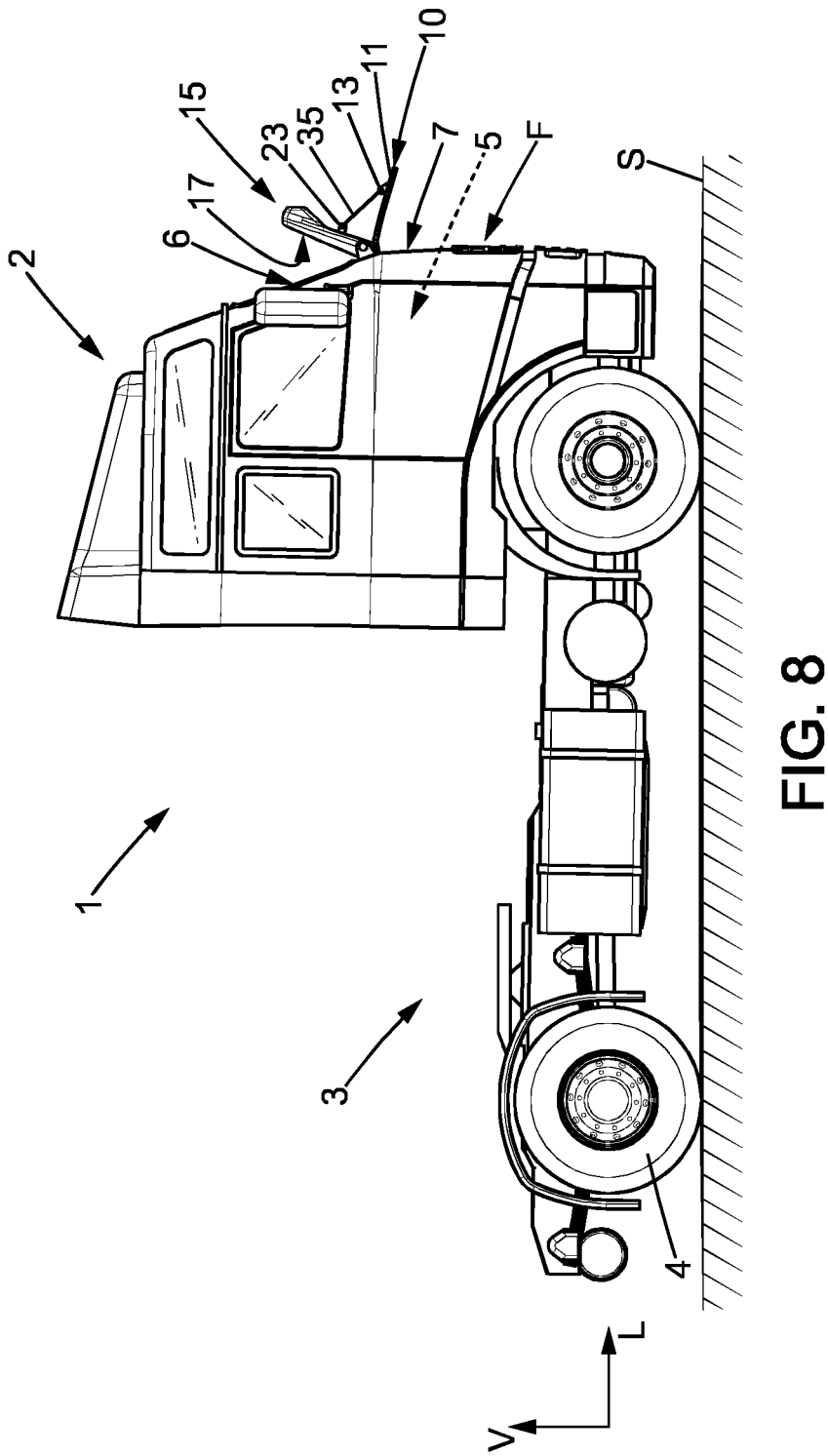
Figure 9:
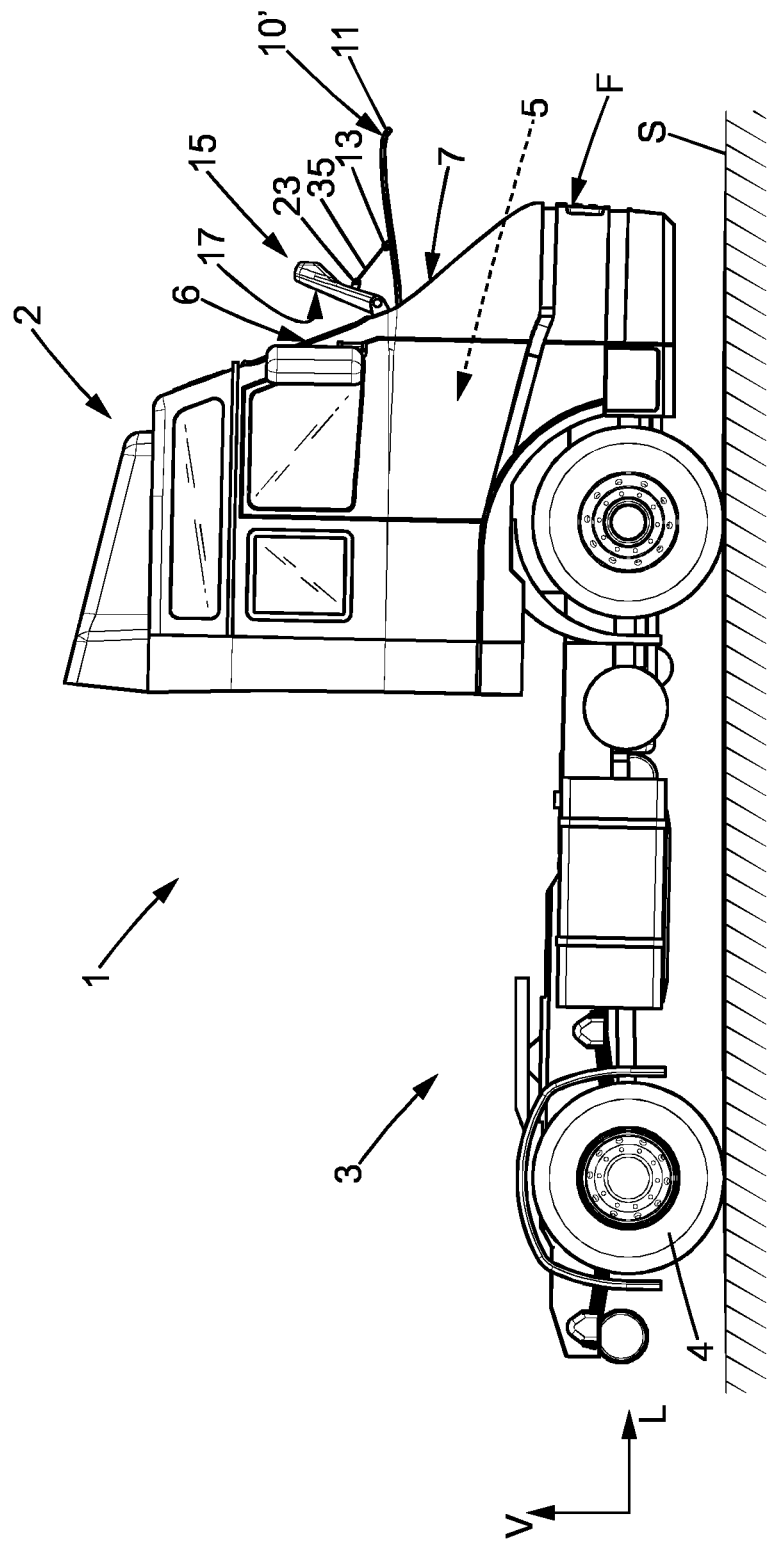

Other objects and advantages of the invention will emerge from the following disclosure of a particular embodiment of the invention given as non limitative example, the disclosure being made in reference to the enclosed drawings in which:

FIG. 1 is a perspective view of a vehicle according to an embodiment of the invention, the vehicle comprising a driver cab and a monitoring device for monitoring a front dead angle area in front of the driver cab, the monitoring device comprising an arm movably mounted to the driver cab and a front camera having a field of view, the arm being in the active position so that the field of view of the front camera images the dead angle area, FIG. 2 is a perspective view of the monitoring device of the vehicle of FIG. 1, FIG. 3 is schematic representation of a pivot mechanism between a first end of the arm and the driver cab of the vehicle of FIG. 1, FIG. 4 is a partial schematic view section along line IV-IV of the pivot mechanism of FIG. 3, FIG. 5 is a perspective view of a portion of a frame and a front panel of the driver cab of the vehicle of FIG. 1, the front panel having an upper portion pivotally mounted to the frame, the front panel being in a closed position, the first end of the arm being pivotally mounted to the frame above the upper portion of the front panel, a connecting rod in a support position extending between an outer surface of the front panel and the arm, FIG. 6 is a view in elevation of the vehicle of FIG. 1 with the arm in the active position and the connecting rod in the support position, FIG. 7 is a view in elevation of the vehicle of FIG. 1 with the arm in a retracted position in which it extends along the outer surface of the front panel, the connecting rod being in a released position in which it allows the arm to move with respect to a front surface of the driver cab, FIG. 8 is a view in elevation of the vehicle of FIG. 1 with the front panel in an open position, the arm being in the active position and the connecting rod being in the support position, FIG. 9 is a view in elevation of a variant of the vehicle of FIG. 1 in which the front panel presents a nose, the front panel being in the open position, the arm being in the active position and the connecting rod being in the support position.

On the Figures, the same reference numbers refer to the same or similar elements.

FIG. 1 represents a vehicle 1 according to an embodiment of the invention. In the represented embodiment, the vehicle 1 is a tractor of a truck comprising a driver cab 2 and a chassis 3 adjoining each other in a longitudinal direction L, corresponding to a direction along which the vehicle 1 moves forward or rearward on a ground surface S. The driver cab 2 and the chassis 3 are mounted on wheels 4 driven by a motor.

The motor is accommodated in a housing 5 of a frame 6 of the driver cab 2. The housing 5 presents an access opening 7 in the longitudinal direction L on a front surface F of the driver cab 2. In particular, the access opening 7 is arranged below a windshield 8 with respect to a vertical direction V perpendicular to the ground surface S. A traverse beam 9 of the frame 6, on which wipers may be mounted, extends between the windshield 8 and the access opening 7. In order to selectively open or close the housing 5, a front panel 10 has an upper portion pivotally mounted to the frame 6 about a panel pivot axis P extending in a transverse direction T perpendicular to the longitudinal L and vertical V directions. The front panel 10 may then be moved between:
- a closed position, shown in FIGS. 1, 6 and 7, wherein the front panel 10 covers the access opening 7 and an outer surface 11 of the front panel 10 extends within the front surface F of the driver cab 2,
- an open position, shown in FIG. 8, wherein the front panel 10 is spaced apart from the access opening 7 which opens on the front surface F of the driver cab 2.

An attaching element 13 in the form of an anchoring ring protrudes on the outer surface 11 of the front panel 10 of the driver cab 2.

The vehicle 1 presents a front dead angle area in front of the driver cab 2, which front dead angle area cannot be viewed by a driver seated in the driver cab 2. In order to monitor the front dead angle area, the vehicle 1 comprises a monitoring device 15 implementing a front camera 16, also referred to as camera of class VI according to the UN Regulation No. 46, arranged so that its field of view may image the front dead angle area.

As shown on FIG. 2, the monitoring device 15 comprises an arm 17 extending along an arm first axis A1 between opposed first 17a and second 17b ends. The arm 17 presents two opposite lateral surfaces 18, spaced apart from each other in an arm second axis A2 perpendicular to the arm first axis A1, and opposite lower 19 and upper 20 surfaces, spaced apart from each other in an arm third axis A3 perpendicular to the arm first A1 and second A2 axes. The first end 17a is provided with a bore 21 extending along an arm pivot axis A4 parallel to the arm second axis A2 and opening in at least one of the lateral surfaces 18. The front camera 16 is mounted on the lower surface 19 at a distance from the first end 17a and, in the represented embodiment, close to the second end 17b of the arm 17. The lower surface 19 of the arm 17 is also provided with an attaching element 23 in the form of an anchoring hook.

As shown in FIG. 3, the first end 17a of the arm 17 is mounted to the traverse beam 9 of the frame 6 so as to be arranged in a central portion of the driver cab 2 with respect to the transverse direction T, above the upper portion of the front panel 10 with respect to the vertical direction V. Thanks to these provisions, the arm 17 secured to the frame 6 is not subjected to vibrations thereby improving reliability of the images acquired by the front camera 16 and preventing a premature wear of the monitoring device 15.

In FIGS. 4 and 5, the first end 17a of the arm 17 is pivotally mounted about the arm pivot axis A4 to the traverse beam 9 of the frame 6 of the driver cab 2 through a pivot mechanism 25. The pivot mechanism 25 comprises a bracket 26 mounted on the central portion of the traverse beam 9 and provided with a through hole 27. A shaft 28 is inserted in the through hole 27 of the bracket 26 and the bore 21 of the first end 17a of the arm 17 so that the arm pivot axis A4 extends along the transverse direction T of the driver cab 2.

The pivot mechanism 25 may be provided with an indexing system enabling a specific position of the arm 17 with respect to driver cab 2, referred to as active position and disclosed in more details below, to be set. To that end, in the illustrated embodiment, the indexing mechanism comprises a notch 29 arranged on an outer surface of the shaft 28 and a complementary member, such as a flat, an elastic tab, a spring biased finger or similar, arranged on an inner surface of the bore 21 of the arm 17. Alternatively, the arrangement of the notch 29 and the complementary member could be inverted.

The pivot mechanism 25 may further include a returning member 30 configured to urge the arm 17 so as to space it apart from the active position. In the represented embodiment, the returning member 30 is a helicoidal spring arranged around the shaft 28.

In other embodiments, the pivot mechanism 25 may be configured to place the arm 17 in a plurality of determined positions, including the active position. The pivot mechanism 25 may then enable a discrete setting in each of the determined positions that are spaced apart from each other. Alternatively, the pivot mechanism 25 may enable a continuous setting in each of the determined positions that are reachable between two determined end positions. In this later case, the pivot mechanism 25 may include a friction arrangement between the arm 17 and the bracket 26.

The monitoring device 15 further comprises a connecting rod 35 configured to be removably connected to the attaching elements 13, 23 of the front panel 10 and the arm 17. The connecting rod 35 presents opposed first 35a and second 35b ends, at least one of which may be attached in a releasable manner to the attaching element 13, 23. In the represented embodiment, the first end 35a of the connecting rod 35 has a hole to be pivotally mounted to the attaching element 13 of the front panel 10, and the second end 35b of the connecting rod 35 has a hole to be attached in a releasable manner to the attaching element 23 of the arm 10. In the represented embodiment, the releasable attachment of one of the first 35a and second 35b end of the connecting rod 35 is obtained by a removable arrangement resulting from a conformation of attaching element 23 of the arm 17 as an anchoring hook. Such releasable attachment could be obtained in any other suitable manner, by the conformation of any of the first 35a and second 35b end of the connecting rod 35 and/or the conformation of any of the attaching elements 13, 23. For example, instead of a removable arrangement of one of the first 35a and second 35b ends of the connecting rod 35 to the attaching element 13, 23, the releasable attachment could be obtained by a sliding arrangement of one of the first 35a and second 35b ends of the connecting rod 35.

In the represented embodiment, the implementation of the connecting rod 35 is complementary to the indexing mechanism. In other embodiments, only the connecting rod 35 or only the indexing mechanism could be used.

An implementation of the monitoring device 15 is disclosed in relation to FIG. 6 to 8.

In FIG. 6, the arm 17 is shown in the active position in which the second end 17b is spaced apart from the front surface F of the driver cab 2 so that the lower surface 19 of the arm 17 substantially faces the ground surface S. The connecting rod 35 is in a support position in which it extends between the outer surface 11 of the front panel 10 and the lower surface 19 of the arm 17 to maintain the arm 17 in the active position against a biasing force exerted by the returning member 30 of the pivot mechanism 25.

In such active position of the arm 17, the field of view of the front camera 16 images the front dead angle area. The arm 17 is placed in such active position in situations where the front dead angle area needs to be monitored, such as driving or manoeuvring.

In FIG. 7, the connecting rod 30 is moved to a released position in which it allows the arm 17 to move with respect to a front surface F of the driver cab 2. In particular, the second end 35b of the connecting rod 35 is detached from the attaching element 23 of the arm 17, letting the returning member 30 of the pivot mechanism 25 to space apart the arm 17 from its active position. The arm 17 is then moved to a retracted position in which the lower surface 19 of the arm 17 faces the front surface F of the driver cab 2 and extends along the outer surface 11 of the front panel 10. In particular, the lower surface 19 of the arm 17 may rest against the outer surface 11 of the front panel 10.

In such retracted position, the risks of shocks with elements coming into contact with the arm 17 as they are moved in closed proximity to the monitoring device 15 are limited. The arm 17 is placed in such retracted position in situations where the font dead angle area does not need to be monitored, such as when the vehicle is parked or washed.

In addition, as shown in FIG. 8, the arm 17 in the active position follows the displacement of the front panel 10 thereby preventing the front panel 10 from damaging the front camera 16 as it is moved from the closed position to the open position.

Thanks to these provisions, the modularity of the driver cab 2 may be further improved since the front panel 10 may be conformed in any suitable manner, especially as regards to aerodynamics considerations. In this respect, FIG. 9 shows a variant of the vehicle 1 of FIG. 1 in which the front panel 10' presents a nose.

The invention has been disclosed in relation with an arm pivotally mounted about an arm pivot axis extending along the transverse direction to the frame of a tractor of a truck.

The invention is however not limited to such embodiment.

Specifically, the invention applies to any vehicle and especially any large vehicle such as trucks, buses or van presenting a front dead angle area.

Also, the arm could be mounted in any other suitable manner to the driver cab so that it is movable between a retracted position in which the arm extends along the front surface of the driver cab, and an active position in which the arm is spaced apart from the front surface.

In particular, as regards actuation of the arm, the invention has been disclosed in relation with an arm 17 that can be manually moved between the retracted position and the active position.

However, the arm 17 could be actuated in any other suitable manner and, especially, in an automated manner.

In this respect, the monitoring device 15 may comprise an actuator configured to move the arm between the retracted position and the active position, and possibly any other determined position. For example, the actuator may be an electric motor arranged to move, directly or through a transmission mechanism, the shaft 28 of the pivot mechanism 25, the arm 17 or a slidable end of the connecting rod 35. In another example, the actuator may be a cylinder arranged in a similar manner as the connecting rod 35 or arranged to move a slidable end of the connecting rod 35. The actuator may be connected to an electronic control unit configured to control movement of the arm 17. The electronic control unit may comprise a processor connected to a memory and to an activation device, such as a switch, so that upon actuation of the activation device by the driver or any other user, the arm is moved to the appropriate position according to instructions stored in the memory and transmitted to the actuator by the processor. In an alternative or complementary manner, the electronic control unit may be connected to one or several sensors so as to move the arm 17 in the appropriate position upon detection of determined situations by the sensors. For example, the arm 17 may be automatically placed in the active position, namely spaced apart from the front panel 10, upon detection of a displacement of the front panel 10 towards the open position by a corresponding sensor.

The invention claimed is:

1. A vehicle comprising a driver cab and a monitoring device for monitoring a front dead angle area in front of the driver cab, the driver cab presenting a front surface, the monitoring device comprising:
   a front camera having a field of view; and
   an arm movably mounted to the driver cab between a retracted position, in which the arm extends along the front surface, and an active position in which the arm is spaced apart from the front surface,
   wherein the front camera is mounted on the arm so that the field of view images the front dead angle area when the arm is in the active position, wherein the monitoring device further comprises a connecting rod presenting a support position in which the connecting rod extends between the front surface of the driver cab and the arm to maintain the arm in the active position, and a released position in which the connecting rod allows the arm to move with respect to the front surface of the driver cab, and the arm and the front surface of the driver cab have respective attaching elements, and the connecting rod has first and second ends attached to the attaching elements in the support position, at least one of the first and second ends and the attaching elements being configured to enable one of the first and second ends to be released from the attaching element.

2. The vehicle of claim 1, wherein the arm presents opposed fast and second ends and a lower surface, the fast end being pivotally mounted about an arm pivot axis to the driver cab, the lower surface being arranged to face a ground surface on which the driver cab rests in the active position, the front camera being mounted on the lower surface at a distance from the first end.

3. The vehicle of claim 2, wherein the arm pivot axis extends along a transverse direction of the driver cab, the lower surface of the arm facing the front surface of the driver cab in the retracted position.

4. The vehicle of claim 1, wherein the driver cab comprises a frame and a front panel, the frame including a housing presenting an access opening in a longitudinal direction on the front surface of the driver cab, the front panel presenting an outer surface, the front panel having an upper portion pivotally mounted about a panel pivot axis perpendicular to the longitudinal direction to the frame between:

a closed position wherein the front panel covers the access opening; and an open position wherein the front panel is spaced apart from the access opening, wherein the first end of the arm is mounted to the frame above the upper portion of the front panel and the attaching element of the front surface of the driver cab is arranged on the outer surface of the front panel.

5. The vehicle of claim 1, wherein the monitoring device comprises a returning member configured to urge the arm towards the retracted position.

6. The vehicle of claim 1, wherein the arm in the retracted position rests against the front surface of the driver cab.

7. The vehicle of claim 1, wherein the arm is arranged in a central portion of the driver cab.

8. The vehicle of claim 1, wherein the monitoring device further comprises an actuator configured to move the arm between the retracted position and the active position and an electronic control unit connected to the actuator to control movement of the arm.

9. A monitoring device for a vehicle, the vehicle comprising a driver cab presenting a front surface, the monitoring device being configured to monitor a front dead angle area in front of the driver cab, the monitoring device comprising:

a front camera having a field of view;

an arm configured to be movably mounted to the driver cab between a retracted position in which the arm extends along the front surface, and an active position in which the arm is spaced apart from the front surface, wherein the front camera is mounted on the arm so that the field of view images the front dead angle area when the arm is in the active position, a connecting rod presenting a support position in which the connecting rod extends between the front surface of the driver cab and the arm to maintain the arm in the active position, and a released position in which the connecting rod allows the arm to move with respect to the front surface of the driver cab, and the arm and the front surface of the driver cab have respective attaching elements, and the connecting rod has first and second ends attached to the attaching elements in the support position, at least one of the first and second ends and the attaching elements being configured to enable one of the first and second ends to be released from the attaching element.

10. The monitoring device of claim 9, wherein the arm presents opposed first and second ends and a lower surface, the first end being pivotally mounted about an arm pivot axis to the driver cab, the lower surface being arranged to face a ground surface on which the driver cab rests in the active position, the front camera being mounted on the lower surface at a distance from the first end.

11. The monitoring device of claim 10, wherein the arm pivot axis extends along a transverse direction of the driver cab, the lower surface of the arm facing the front surface of the driver cab in the retracted position.

12. The monitoring device of claim 9, wherein the monitoring device comprises a returning member configured to urge the arm towards the retracted position.

13. The monitoring device of claim 9, wherein the arm in the retracted position rests against the front surface of the driver cab.

14. The monitoring device of claim 9, wherein the arm is arranged in a central portion of the driver cab.

15. The monitoring device of claim 9, further comprising an actuator configured to move the arm between the retracted position and the active position and an electronic control unit connected to the actuator to control movement of the arm.

\* \* \* \* \*